Figure 7:
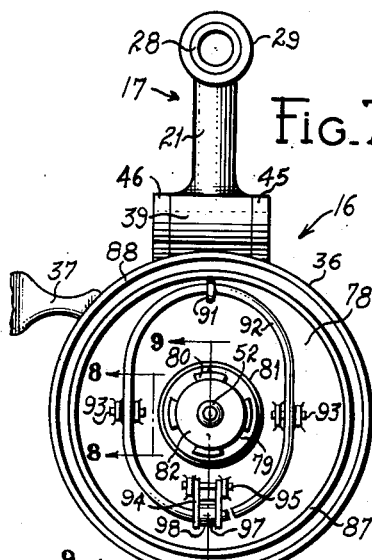

June 21, 1955   J. K. TAGGART ET AL   2,711,292
SPINNING TYPE OF FISHING REEL
Filed Oct. 17, 1952   2 Sheets-Sheet 1
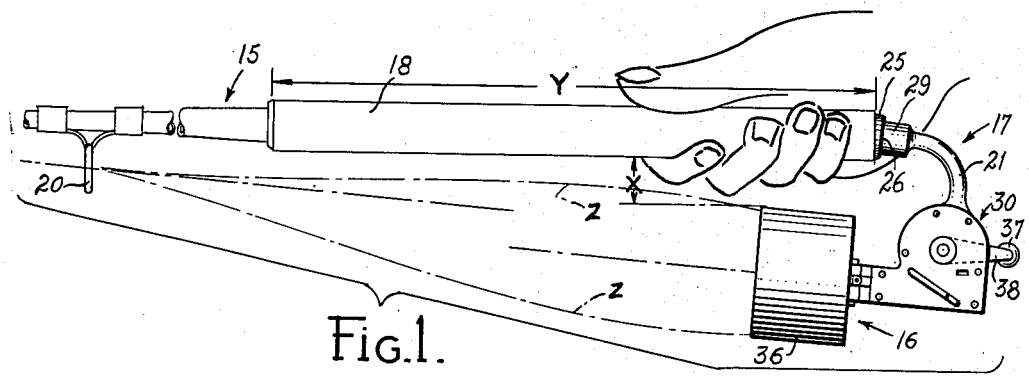
Fig.1.
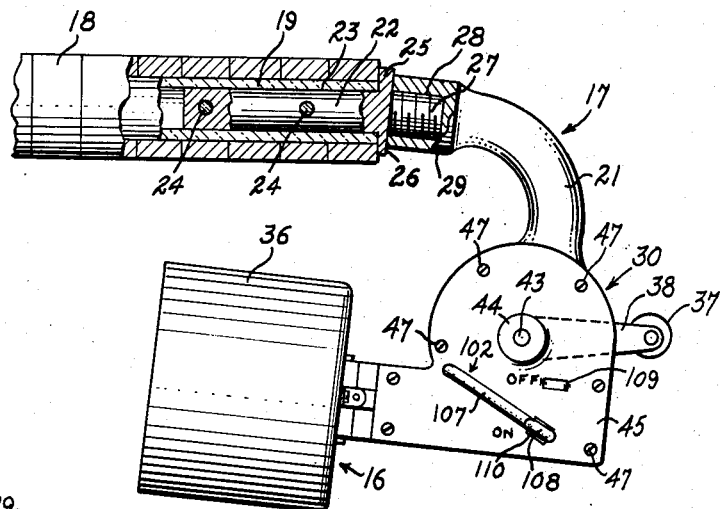
Fig.2.
Fig.3.
Fig.4.
INVENTORS
JOHN K. TAGGART
JAMES C. TAGGART
BY George A. Ordway
ATTORNEY June 21, 1955  J. K. TAGGART ET AL  2,711,292
SPINNING TYPE OF FISHING REEL
Filed Oct. 17, 1952  2 Sheets-Sheet 2

INVENTORS
JOHN K. TAGGART
BY JAMES C. TAGGART
George A. Ordway
ATTORNEY

United States Patent Office 2,711,292
Patented June 21, 1955

2,711,292

SPINNING TYPE OF FISHING REEL

John K. Taggart and James C. Taggart, Indianapolis, Ind.

Application October 17, 1952, Serial No. 315,276

11 Claims. (Cl. 242—84.4)

This invention relates to improvements in fishing reels of the "spinning type" and to a fixed mount for affixing such a reel to a fishing rod.

An object of the invention is to provide a spinning reel in which there are no awkward, line-fouling, extraneous or protruding parts and in which substantially all of the parts are arranged and completely housed in such a manner that, notwithstanding their encasement, free, easy, smooth and unfettered payoff of line in casting is insured and detrieve of line is acomplished with a minimum of resistance or drag or bind or counter-opposing torque upon either the line or any of the components of the reel and rod structure.

Another object is to provide a spinning reel in which the line engagement or pickup takes place automatically and substantially instantly upon the commencement of retrieve; is positive and direct in character and is maintained so throughout the entire reeling-in operation.

A further object of the invention is to provide a spinning reel which is light, compact, durable, simple in design and construction, comprised of few parts that are economically manufactured and assembled, cooperatively function interdependently during reeling and casting and are easy and conveniently disassembled for such maintenance as may be required.

These and other objects of this invention will become apparent to those skilled in the art upon becoming familiar with the following description when taken in conjunction with the acompanying drawings in which like parts are designated by like reference numerals.

Figure 5:
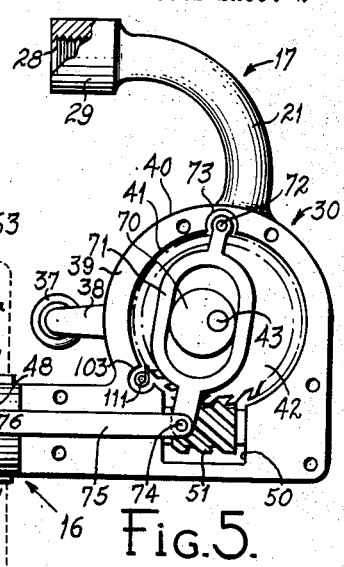
Figure 9:
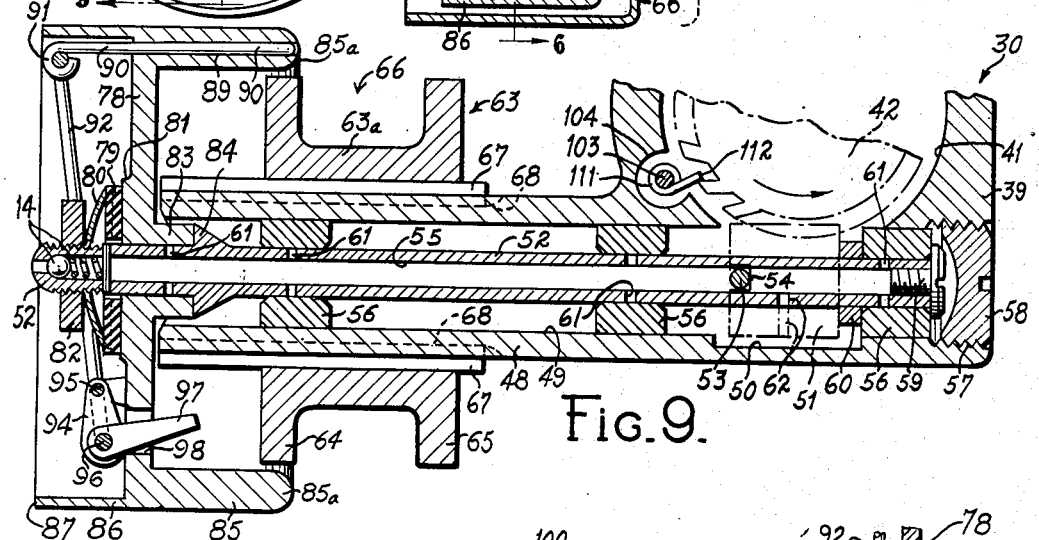
Figure 6:
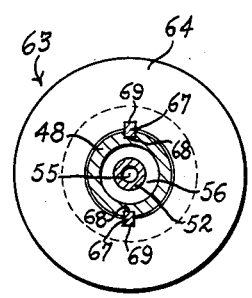
Figure 10:
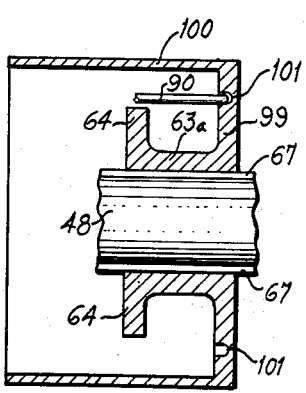
Figure 8:
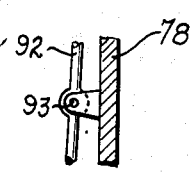

In the drawings:

Fig. 1 is a side elevation showing our improved reel and mount therefor in association with a fishing rod, Fig. 2 is a detailed side elevation, partly in section of the mount shown in Fig. 1, Fig. 3 is a view similar to Fig. 2 but showing a modified form of reel mount, Fig. 4 is a rear elevation of the improved reel, Fig. 5 is an enlarged left side elevation thereof with its gear case side plate removed, certain parts of the reel structure being shown in section, Fig. 6 is an elevation showing the front of the spool taken substantially along the line 6—6 of Fig. 5, Fig. 7 is a front elevation thereof, Fig. 8 is a detailed sectional elevation taken along the line 8—8 of Fig. 7, Fig. 9 is a greatly enlarged section taken substantially along the line 9—9 of Fig. 7, and Fig. 10 is a partial sectional elevation of a modified form of spool which can be embodied in the reel construction.

Referring to Fig. 1, a rod of the type upon which the improved spinning reel is adapted to be mounted is indicated generally at 15, the reel being indicated generally at 16 and the mount for attaching the reel to the rod is indicated generally at 17. Rod 15 has the usual handle 18 surrounding the rear end 19 (Fig. 2) of the rod and forwardly of the rod there is dependingly mounted the usual first or butt line guide 20. Mount 17 comprises a curved, loop shank 21 of light material such as magnesium or aluminum alloy, adapted to be mounted as shown in Fig. 1 to the terminal end of the butt to support reel 16 in spaced, dependingly, rearwardly, offset and underslung position, preferably at such an angle with respect to the longitudinal axis of the rod that the longitudinal axis of the reel preferably lies in substantial coaxial alignment with the longitudinal axis of guide 20.

A permanent type of this mount is shown in Figs. 1 and 2 and comprises a cylindrical stud 22 fixedly mounted within bore 23 at the rear end 19 of rod 15 by means such as pins 24. A flange 25 provided on stud 22 has its rear face 26 formed at an incline. A threaded rearwardly projecting, angularly disposed continuation 27 of the stud is adapted to threadably receive a correspondingly threaded bore 28 provided on the upper end of an enlarged portion 29 of shank 21. The lower end of the shank is formed integrally with or affixed in any suitable manner to the upper end of a gear case 30. Case 30 is a component of reel 16 later to be more fully described. The angle of face 26 is such that when the forward face of enlarged portion 29 is seated flat and flush thereagainst as shown in Fig. 2 the substantial coaxial alignment of the longitudinal axis of the reel with the like axis of guide 20 as before described is accomplished merely by threading bore 28 upon the angularly disposed continuation 27 of stud 22, the degree of curvature of shank 21 being such as to cause this relative location of these parts. It will be understood that, if desired, the rearwardly extending portion 27 could be formed to extend coaxial with stud 22 and the coaxial relation between the longitudinal axis of the reel and the like axis of guide 20 could be accomplished by altering the degree of curvature of shank 21. The mount just described desirably is provided in a rod and spinning reel combination wherein these two components are sold as a complete unit.

The form of mount 17 shown in Fig. 3 is provided for adaptation of the reel for terminal butt mounting upon a rod in instances where the angler already possesses the rod and desires only to purchase the reel and yet receive the advantages derived from terminal butt mounting of the reel in spaced, offset, underslung relation to the rod. This mount is identical with that described in the foregoing except that the enlarged portion 29 of its curved shank 21 merges into a hollow, forwardly extending sleeve 31 adapted to be telescopically slid over the terminal butt end of rod handle 18. Sleeve 31 preferably is provided with spaced, longitudinally extending slots 32. At its forward end sleeve 31 is provided with means for securely affixing it and its depending loop shank 21 to handle 18. The affixing means herein shown comprises a knurled, annular ring 33 provided internally with tapered threads adapted to be threadably engaged upon correspondingly tapered threads 34 provided externally upon the forward end of sleeve 31. By turning ring 33 upon threads 34 the portions of sleeve 31 lying between slots 32 are flexed inwardly into a tight, frictional engagement with the surface of handle 18. If desired, inwardly projecting fangs or spurs 35 may be provided at spaced intervals interiorly of sleeve 31 to secure a positive biting grip into the cork or other material of which handle 18 may be fabricated.

The depending, rearwardly projecting offset mount of the reel, as just described, provides clearance indicated at "X" (Fig. 1) between a reel housing 36 mounted on case 30 and the handle 18. This clearance "X" is ample to permit freedom of action of the fingers and knuckles of the user along handle 18 without interference in any manner by reel 16. Such mount also permits a freedom of choice of place of grasp along handle 18 coextensive with its entire length "Y" as clearly shown in Fig. 1. By manipulatory action of the thumb and fingers the position of grasp may be changed one-handedly at will, without interference or restrictions such as are present with conventional reel mountings wherein the reel is attached at a point intermediate the ends of the handle in immediate subjacent relation thereto by means of a reel seat clip. The improved mount herein shown and described enables the angular to govern his choice of position for grasp solely by the factors of comfort, balance and/or leverage which he at any given time may desire and permits a one-handed change of position as above described so that the grasp shall be at a point along the length of the handle that is most favorable for effecting the operation currently being performed.

For example: suppose the grasp is originally taken near the terminal of the butt as shown in Fig. 1 but with the left hand instead of the right as therein shown, and further suppose that a fish strikes the line and the angler has grasped a handle 37 provided on a crank 38 of the reel and commenced to rotate the latter counter-clockwise as viewed in Fig. 1, to reel in the line. If more leverage is desired during the retrieve operation the angler need only manipulate the fingers and thumb of his left hand forwardly along the handle whilst at the same time continuing rotation of crank 38 without let-up, until the position of grasp along the handle gives the best leverage advantage commensurate with the pull exerted by the strike and the downward pressure being exerted upon the crank. In other words, there is no requirement for removing the right hand even momentarily from crank 38 to grasp the rod while making the change in position of grasp by the left hand. Such latter two-handed manipulation would be necessary in conventional reel mount constructions especially when the desired point of grasp upon the handle lies at a place forwardly of such conventional reel mount because the left hand could not possibly by-pass the conventional mount unless the rod was being supported by the right hand while such a shift was being made. Additionally, although as will hereinafter appear, reel 16 is made as light in weight and as compact as possible, such weight and mass as it does possess is positioned by mount 17 at a point with respect to rod 15 and handle 18 as will most advantageously serve to counterbalance and offset other forces acting upon the rod and line both in casting and retrieve operations.

The provision of a rod mount which permits one-handed manipulation to the desired place of grasp along the rod handle is highly desirable in casting operations also. Turning again to Fig. 1, it is seen that the right hand may by cooperative finger and thumb manipulation, be shifted forwardly or rearwardly along the entire length of the handle with utmost freedom and completely unhampered by any restrictions such as are imposed by conventional reel mounts wherein the reel lies immediately adjacent the rod. By making a few preliminary cast motions the position of grasp may be one-handedly, expeditiously and facilely adjusted to and fro along the handle in accordance with weight of lure, line, length of rod, approximate length of cast sought, the lattitude of arc afforded by the terrain and its growth environment, and like considerations.

The construction of reel 16 will now be described. As before stated, it includes a gear case 30. Case 30 is comprised of a rectangular and relatively flat central section 39 having a rounded, upwardly projecting end 40 (Fig. 5) to which is affixed the lower end of shank 21 as heretofore described. Centrally of section 39 there is provided a circular opening 41 extending transversely through the section and adapted to receive a helically toothed, worm driving gear 42 (Figs. 5 and 9) fixed upon a horizontally disposed driving shaft 43. Shaft 43 also extends transversely through section 39 and is journalled at its opposite ends in outwardly projecting bosses 44 (Fig. 4) provided on side walls or plates 45 and 46. Plates 45 and 46 are secured as by means of screws 47 (Fig. 2) to the opposite sides of section 39. The right hand end of shaft 43 (Fig. 4) extends through its boss 44 and has affixed thereto crank 38.

A forwardly projecting spool support or bearing 48 (Figs. 5 and 9) of circular cross section (see Fig. 6) is preferably formed integrally with section 39 of case 30. Spool bearing 48 is provided with a bore 49 (Fig. 9) extending longitudinally therethrough. Bore 49 extends completely through to the rear end of section 39 and communicates intermediate its ends with an enlarged recess 50 provided in the base of section 39. Recess 50 is adapted to receive with clearance a helically toothed worm 51 which meshes with worm gear 42 and is driven thereby. Gear 51 is fixed to a shaft 52 by means of a pin 53 extending transversely through said shaft. The ends of pin 53 are articulated in oppositely disposed notches such as 54 provided in the gear. Shaft 52 is hollow having its bore 55 extending throughout the length of the shaft which latter is journalled for rotation in bearings 56 press-fittedly secured within bore 49 at spaced intervals therealong. As viewed in Fig. 9, the extreme right hand end of bore 49 is threaded as at 57 to receive a slotted, screw-threaded plug 58 for closing the bore. Similarly, the right hand end of bore 56 is internally threaded to receive a flat-headed screw 59. When screw 59 is secured within bore 55 as shown in Fig. 9, its inner face rests flat against the outer face of the outermost bearing 56 to retain shaft 52 against longitudinal or thrust movement, a spacer 60 being interposed between gear 51 and said outermost bearing 56.

The terminal, left end of shaft 52 is somewhat reduced and is fitted with a suitable releasable closure such as, for instance, a spring-pressed ball assembly 14 as shown in Fig. 9. Transversely disposed lubrication ports such as 61 are provided in shaft 52 at all points therealong where the shaft passes through a bearing 56 and a similar port 62 is provided through shaft 52 and gear 51.

By means of the construction just described, substantially all moving parts of the reel structure may be lubricated from one single source, namely 14, without requiring the dismounting of side plates 45 and 46 or any other parts of the reel. The lubricant is introduced through the spring-pressed ball assembly 14 into bore 55 and, in turn, passes through ports 61 to the respective bearing surfaces and through port 62 to gears 51 and 42.

A spool generally indicated at 63 for receiving the line, and formed of light weight material such as a suitable plastic, aluminum, or magnesium alloy is mounted for sliding movement on the forwardly projecting spool bearing 48. The spool is comprised of a hub 63a having a forward flange 64 formed on the forward end of the hub and a similar flange 65 formed on the rear end thereof thus forming a wide open throat 66 between the flanges. The spool is held positively against rotation on bearing 48 by a pair of oppositely disposed keys 67 fixed in ways 68 provided in the upper and lower surfaces of bearing 48, the spool being slotted vertically as at 69 (Fig. 6) to be slidably mounted over keys 67.

A means for imparting limited reciprocal forward and rearward movement to the spool is provided. This means includes a pair of eccentrically mounted, circular cams such as 70 (Fig. 5) fixed to driving shaft 43, each cam being mounted just inside the inner surface of its respective side plates 45 and 46 (Fig. 4). A yoke strap such as 71 (Fig. 5) is associated with each cam 70 and is pivoted at its upper end as at 72 in a recess 73 provided in the sidewall of section 39. The lower end of each strap 71 is pivotally connected as at 74 to the rear end of a link 75 of flat stock mounted for guided rectilinear, sliding movement in slots in the opposite side faces of section 39. The forward end of each link 75 is pivotally secured as at 76 to the rear face of the flange 65 of spool 63.

The disposition of cam 70 on shaft 43 is such that as crank 38 reaches the most forward position of its circular path of travel as shown in Fig. 5, spool 63 likewise lies at the terminus of its forward stroke and when crank 38 is swung through a 180 degree arc to its most rearward position, spool 63 correspondingly lies at the terminus of its rearward stroke as shown in Fig. 2.

This arrangement coupled with another aspect of the reel construction, later to be described, reduces the overall length of the reel assembly to a minimum and tends toward rendering a closely coupled, compact construction. The reciprocating fore and aft movement is, of course, utilized as usual to lay the line evenly and levelly upon the spool during line retrieve operations wherein the line is rotatably twirled about the axis of hub 63a during retrieve operations by a mechanism now to be described.

The line winding mechanism comprises a cylindrical, cup-shaped, flyer 78 (Figs. 5 and 9) of light-weight plastic, aluminum or magnesium alloy. Flyer 78 is frictionally affixed to the forward end of driven shaft 52 in front of spool 63. The friction means includes a washer 79 of "Teflon" or other wear-resisting material that is held frictionally under the tension of a star type, pronged, leaf spring 80 against a circular, forwardly projecting land 81 formed on the forward face of flyer 78.

The prongs of spring 80 are preferably articulated in any suitable manner in the forward face of washer 79. A knurled nut 82 preferably of what is known as the "Locknut" type is threadably mounted on external threads provided on the forward end of shaft 52. Nut 82 preferably is affixed as by brazing or the like to spring 80 and provides a control readily accessible to the angler for regulating the degree of brake or "drag" force that is applied by spring 80 and washer 79 between flyer 78 and shaft 52.

An inwardly projecting bushing 83 (Fig. 9) provided concentrically on the inner face of flyer 78 is arranged to engage an upset portion 84 formed peripherally around shaft 52 thus providing an end thrust bearing for flyer 78.

Flyer 78 is formed with an annular, rearwardly projecting flange 85, the rearmost edge of which is rounded as at 85a, the inner diameter of the flange being such as to provide marginal clearance to permit entrance of spool 63 within the recess formed by the flange.

The entrance of the spool into flyer 78 occurs during the forward stroke of the spool and is of such extent that the spool lies substantially completely within the confines of the flyer when the spool reaches the terminus of its forward stroke as shown in Fig. 5. By recessing flyer 78 so as to receive spool 63 during its forward stroke and by moving the spool into the recessed flyer synchronously with the forward movement of crank 38, the over-all length of the reel construction is rendered as compact as possible consistent with the employment of a straight crank structure (i. e., a crank free of angular clearance bends or offsets) and a mounting for such crank that is laterally adjacent and relatively close to the plane of the vertical center of the reel as shown in Fig. 4. Such "close in" or immediately, laterally adjacent mounting and straight crank construction is highly desirable in that it reduces lateral torque and thrust upon the reel and rod assembly during line winding-in or retrieve operations.

A forwardly projecting, horizontally disposed, annular flange 86 provided on flyer 78 has its forward edge 87 lying in a vertical plane substantially coterminous with the forward end of shaft 52. The dual flange construction 85—86 in effect, per se, provides a housing or protective shroud for the reel elements thus far described as well as for components of flyer 78 later to be described.

However, in the interests of providing further overall protection and a certain minimum degree of guidance to the loop of line during payoff, a completely open-mouthed, cup-shaped housing 36 (heretofore mentioned) of light-weight material such as aluminum, or the like, is mounted as by rivets 36a, or the like, to flange 65 for reciprocatory movement with spool 63. Housing 36 is of such internal diameter as to provide adequate clearance between its inner surface and the outer surface of flanges 85—86 to insure free, smooth, and unrestricted payoff of line from spool 63 during casting operations and equally unfettered reel-in of line during retrieve operations.

The parallel confrontation of the opposed horizontally disposed external face of flange construction 85—86 and the internal face of housing 36 provides a minimum of straightforward but effective guidance to the line without any untoward payoff-resisting, angular bends being imparted thereto. The depth of housing 36 preferably is of such an extent that its forward edge 88 lies marginally forward of the vertical plane of the forward edge 87 of flange 86 (Fig. 5), thereby affording ample protection to all of the parts of the spool and flyer assembly.

The completely open mouth of the housing permits substantially as free and unrestricted payoff of line from spool 63 as if the housing were not present and yet serves to protect the reel parts from untoward buffeting or damage such as is prone to occur in normal use as when the rod and reel assembly is casually laid say in the bottom of a boat as in trolling procedures or the like.

Referring now to Fig. 1 it will be seen that as the line pays off from spool 63 the extreme arc of the line loop will tend to have a slight tangential but nevertheless effective guiding contact with the forward inner corner of the housing at its forward edge 88 as illustrated by the dot and dash lines Z in this figure. This light but positive line engagement materially lessens possibility of line slap against handle 18 or the fingers and thus reduces the resistance normally attending such a slap and the opportunity for fouling of the line during payoff.

Flyer 78 has a horizontally disposed bore 89 (Figs. 5 and 9) provided within its flange 85. Within bore 89 there is slidably mounted a pickup element 90. Element 90 comprises a simple, single pin preferably formed of "Carboloy" or similar wear-resisting material. The rear end of the pin 90 preferably is rounded and, when the pin is in its retracted position within flanges 85—86 as shown in Fig. 9, said end lies inwardly of the plane of the rounded, inner end 85a of flange 85. The forward end of pin 90 is formed with an eye 91 pivotally encircling the upper end of a manipulative bail member 92 of spring stock.

Member 92 (Fig. 7) is of generally ovate shape and is pivotally mounted at its opposite sides at 93 intermediate its upper and lower ends upon the forward face of flyer 78 as clearly shown in Figs. 7 and 8. A manipulative yoke type toggle lever 94 pivotally mounted at its upper end as at 95 between forwardly projecting lugs provided on flyer 78 is also pivotally connected at its lower end as at 96 (Fig. 9) to the lower end of bail 92. The lower end of bail 92 may be split as shown in Fig. 7 to impart a freer and less resistant yielding spring action thereto. The parts just described are so arranged that when pin 90 lies in its retracted position within the confines of flanges 85—86 as shown in Fig. 9, lever 94, under the tension exerted by spring bail 92, lies to one side or, more specifically, to the right (as viewed in Fig. 9) of the vertical center of pivot mounting 95. In this position, a finger 97 fixedly mounted on the lower end of bail 92 between the yoked sides of toggle lever 94 projects inwardly through an aperture 98 provided in flyer 78 a distance sufficient to be engaged by the forward face of flange 64 of spool 63 concurrently upon the spool traversing approximately one-half the distance of its forward stroke. Upon such engagement by flange 64, finger 97 is thrust leftwardly as viewed in Fig. 9 from the position shown therein to rock lever 94 clockwise about its pivotal mounting 95, past the vertical center thereof whereupon, under the tension exerted by spring bail 92, the latter is rocked about its pivotal mounting 93 into the position shown in Fig. 5. This movement of bail member 92 is sufficient to project pin 90 rearwardly from within bore 89 so that the rounded rear end of the pin overlies the outer edge of flange 65 of the spool when the latter reaches the forward position of its reciprocal stroke and thereby completely bridges throat 66 of the spool. The closing of throat 66 by pin 90 renders the line positively captive within the throat and this occurs substantially immediately upon commencement of reeling-in rotation of crank 38 and at least once during each reciprocation of the spool along bearing 48 and thus insures a positive line pickup.

When it is desired to ready the reel for casting it is merely necessary to move crank 38 to the position shown in Fig. 2 and press inwardly upon the lower end of lever 94 or bail 92 sufficiently to move such lower end to a position where it passes the vertical center of its pivot 95 whereupon spring bail 92 takes over and snaps pin 90 into its retracted position within bore 89 and projects finger 97 toward spool 63 as shown in Fig. 9. The complete containment of pin 90 within flanges 85—86 assures a smooth, easy and unrestricted pay-out of line over the smoothly rounded surface 85a of flange 85. It is readily seen that the mounting of the manipulative means comprising bail 92 and lever 94 forwardly of the forward face of flyer 78 and spool 63 disposes this mechanism in such position with respect to the fingers of the angler's casting hand (see Fig. 1) as permits its free accessibility for ready manipulation simply as by lowering say, the index digit of such hand into engagement therewith. Slight pressure inwardly, i. e., toward the rear of the reel structure, will effect retraction of pickup element 90.

Since, just prior to effecting a cast, the angler's index digit is customarily not curled around the rod handle 18 as shown in Fig. 1, but is lowered slightly to a position where it will be engaged by the line to prevent undesired line payoff the instant that the pickup element is retracted to its ineffective position, a simple flick of such index finger upon control means 92—94 (or other convenient digital manipulation) results in the reel being readied for casting. It is noted that in certain instances the index finger may either be retained in contact with the line or, substantially in one continuous movement, the pickup release be effected and the index finger brought forthwith into line engagement just prior to following through with the arm motion of the cast. If, in lowering the finger to manipulate control means 92—94, the line should happen to lie below the plane of the finger due to the pickup element 90 happening to lie in the lower half of its circular path of travel, this is of no consequence for the instant that the pickup 90 is retracted, the first complete or fractional convolution of line payoff brings the line into contact with the lowered finger. Hence, such contact of the finger by the line will occur irrespective of the particular location of the element 90 in its circular path at the moment of the retraction of such element.

The completely open mouths of housing 36 and flyer flange 86, coupled with the forward disposition of the manipulative control means 92—94 with respect to the forward face of flyer 78 (which, it will be remembered, lies forwardly of spool 63) contribute to the simplicity of the construction and at the same time provide an effective, convenient and readily accessible control that requires but a single finger of the casting hand to perform the maneuver.

A modified form of spool and housing construction is illustrated in Fig. 10. Where the parts of the spool are identical with the parts of the spool just described, identical reference characters are applied thereto. In this modification the spool 63 has a hub 63a mounted on the spool bearing 48 and is held non-rotatably thereon by keys 67. The spool has a forward flange 64. The rearward flange 99 extends radially outwardly a greater distance than forward flange 64 and has formed integrally therewith a cup-shaped reel housing 100 corresponding to the housing 36. The inner face of flange 99 is provided with an inwardly projecting, concentric, annular recess or channel 101 adapted to spacedly receive the rear end of pick-up pin 90 when the latter is projected rearwardly into its line pick-up position. The construction just described affords a somewhat more positive rendering of the line captive within the throat of the spool although it has been found in practice that the construction previously described in conjunction with Figs. 5 and 9 has not once failed in effecting a positive line pick-up in continuous use in fishing that has been carried on over an extended period.

Since spool 63 is fixed positively against rotation but mounted for reciprocation longitudinally and flyer 78 is rotatably but non-reciprocatingly mounted forwardly of the spool there is provided a construction that is operatively free of any counter-opposing torques between the driving and driven elements of the assembly. In known constructions of reels of this character wherein either the flyer or the spool element is arranged to be solely and independently both driven in rotation and reciprocated there is a marked tendency for their associated and interconnected driving and driven means to bind, lock-up or present such a degree of resistance, particularly in reeling-in operations, as to render them unsatisfactory for the sport. The construction herein described provides a mutually cooperative balance of the level wind and reel-in functions in a manner that insures smooth and efficient operation. The provision of the brake or "drag" in association with the flyer rather than with the spool likewise is conducive to the elimination of untoward counter-opposing and undesirable torques during the various phases of operation of the reel.

It is frequently desirable to use spinning reel equipment for trolling or the like. Accordingly, the reel of the present invention is provided with a simple, inexpensive yet reliably operative click mechanism adapted to give an audible signal of a strike and so constructed as to be foolproof against misoperation.

The click mechanism comprises an L-shaped lever indicated generally at 102 in Figs. 2 and 4. Lever 102 is preferably formed of relatively heavy spring stock. A foot portion 103 of lever 102 extends transversely across section 39 of case 30 in spaced relation from the teeth of driving gear 42 (Figs. 5 and 9) within a recess 104 provided in section 39. The opposite ends of foot portion 103 are journalled, respectively, as at 105 and 106 in side plates 45 and 46. The leg portion 107 of L-shaped lever 102 extends through plate 45 and toward the rear of the case 30. The free end of leg portion 107 is preferably formed with an enlarged eye or fingerpiece 108 (Figs. 2 and 4) arranged to be releasably but latchedly received within either of a pair of arcuately spaced recesses 109 and 110 (Figs. 2 and 4) milled or otherwise provided in the outer face of plate 45. Leg 107 being formed of spring stock, yieldingly but positively retains fingerpiece 108 in either of the recesses 109 and 110. A relatively light spring 111 wound encirclingly about foot portion 103 has one end secured thereto and its opposite end 112 extending from the underside of portion 103. As shown in full lines in Fig. 9, end 112 extends from foot portion 103 a distance sufficient to engage the teeth of driving gear 42 when lever 102 is moved to the position shown in Fig. 2 with fingerpiece 108 seated in recess 110. End 112 is moved out of engagement with the teeth of gear 42 (as shown in full lines in Fig. 5) when lever 102 is swung upwardly so that fingerpiece 108 is removed from recess 110 into recess 109. This latter movement renders the click mechanism inoperative. When lever 102 is moved so that the click mechanism is "on" or operative, i. e., with fingerpiece 108 in recess 110 and the end 112 of spring 111 in engagement with the teeth of driving gear 42, rotation of the latter in a clockwise direction, as it is so rotated when a fish strikes, will wind or snub spring 111 tightly about foot portion 103 and, as the teeth of gear 42 pass thereover, a sharp, clearly audible click results. The attendant resistance produced by the friction of the gear teeth as they pass over end 112 in its snubbed condition imparts a braking action upon the line and eliminates the necessity for an anti-reversing crank construction.

In the event that the angler should inadvertently or unwittingly commence reeling-in operations with the click mechanism adjusted to "on" position, no damage will be occasioned to the parts since, when gear 42 is rotated in a counterclockwise direction (Fig. 9), end 112 of spring 111 tends to slightly uncoil the spring about foot portion 103. The free yielding movement of the spring when it is engaged in this reverse direction results in a much lighter engagement of end 112 with the teeth of gear 42 so that there is very slight resistance encountered and a considerably reduced audible click produced during such misoperations. It will be understood, of course, that the click mechanism shoul be moved to its "off" position during reeling-in operations but it frequently happens that the angler forgets to release the click mechanism in the excitement of receiving a strike. The construction just described renders such forgetfulness and misoperation harmless. No damage can occur to the reel thereby and the pliant yielding action of end 112 when moved in this direction results in no material increase in load upon the line while reeling in the catch.

It is to be understood that the foregoing is presented as illustrative or exemplary and not as limitative or restrictive and that within the terms of the appended claims various additions, omissions, modifications and substitutions may be made without departing from the spirit or principle of the invention.

We claim:

1. In a reel of the class described, a gear case having driving means associated therewith and a stationary spool bearing projecting therefrom, a shaft having a driving connection with said driving means, said shaft extending longitudinally through said bearing and being journalled for rotation therein, a cylindrically flanged flyer, friction means affixing said flyer to one end of said shaft for rotation therewith, an open-throated spool mounted rearwardly of said flyer for longitudinal reciprocal movement on said bearing, a line pick-up member slidably mounted within said flange and projectable therefrom toward said spool, and manipulative means associated with said member operable by said spool during the forward stroke of its reciprocal movement to project said member across the throat of said spool to thereby render the line positively captive within said throat at least once during each reciprocation of said spool.

2. In a reel of the class described, a gear case having driving means associated therewith and a stationary spool bearing projecting therefrom, a shaft having a driving connection with said driving means, said shaft extending longitudinally through said bearing and being journalled for rotation therein, a cylindrically flanged flyer, friction means affixing said flyer to one end of said shaft for rotation therewith, an open-throated spool mounted rearwardly of said flyer for longitudinal reciprocal movement on said bearing, a line pick-up member slidably mounted within said flange and projectable therefrom toward said spool, manipulative means associated with said member operable by said spool during the forward stroke of its reciprocal movement to project said member across the throat of said spool to thereby render the line positively captive within said throat at least once during each reciprocation of said spool, and a cylindrical, open-mouthed, cup-shaped, forwardly projecting, housing associated with said spool for reciprocation therewith and spacedly surrounding said spool, flyer, and pick-up member manipulative means.

3. In a reel of the class described, a gear case having driving means associated therewith and a stationary spool bearing projecting forwardly therefrom, a shaft having a driving connection with said driving means, said shaft extending longitudinally through said bearing and being journalled for rotation therein, a cylindrical flyer having a rearwardly projecting, peripheral flange forming a recess for spacedly receiving a spool therein, manipulatively adjustable friction means affixing said flyer to the forward end of said shaft for rotation therewith, an open-throated spool mounted rearwardly of said flyer for reciprocal movement longitudinally along said bearing, said spool being at least partially receivable within said recess during the forward stroke of its reciprocating movement, a line pick-up pin retractively mounted within the confines of said flange and projectable therefrom toward said spool, and manipulative means mounted on said flyer and associated with said pin operable under the control of said spool to move and latch said pin its its projected position whereby the throat of said spool is positively closed by said pin at least once during each reciprocation of said spool incident to and following the first forward stroke of said spool.

4. In a reel of the class described, a gear case having driving means associated therewith and a stationary spool bearing projecting forwardly therefrom, a shaft having a driving connection with said driving means, said shaft extending longitudinally through said bearing and being journalled for rotation therein, a cylindrical flyer having a rearwardly projecting, peripheral flange forming a recess for spacedly receiving a spool therein, manipulatively adjustable friction means affixing said flyer to the forward end of said shaft for rotation therewith, an open-throated spool mounted rearwardly of said flyer for reciprocal movement longitudinally along said bearing, said spool being at least partially receivable within said recess during the forward stroke of its reciprocating movement, a line pick-up pin retractably mounted within the confines of said flange and projectable therefrom toward said spool, manipulative means mounted on said flyer and associated with said pin operable under the control of said spool to move and latch said pin in its projected position whereby the throat of said spool is positively closed by said pin at least once during each reciprocation of said spool incident to and following the first forward stroke of said spool, and a forwardly projecting peripheral flange on said flyer having its forwardmost edge lying forwardly of the vertical plane of said flyer and said manipulative means.

5. In a fishing reel of the spinning type, a casing having driving mechanism therein and a fixed spool bearing projecting forwardly therefrom, an open-throated spool mounted for reciprocal sliding movement longitudinally thereof but fixed positively against rotation thereon, means connecting said drive mechanism to said spool for imparting said reciprocal movement thereto, a driven shaft having driving connection with said driving mechanism extending through said bearing and journalled for rotation therein, a cylindrical flyer frictionally affixed to said shaft forwardly of said spool, said flyer having an annular flange projecting toward and adapted to spacedly receive said spool therewithin during the forward stroke of the latter, a line pick-up pin mounted for horizontal movement within said flange and projectable therefrom, manipulative means associated with said flyer and said member operable under the control of said spool during its forward stroke to project said pin across the throat of said spool and thereby render the line captive within said throat at least once during each reciprocation of said spool.

6. A reel as set forth in claim 5, in which said spool has a flange having an annular recess disposed on its forward face in alignment with said pick-up pin, said recess being adapted to spacedly receive the projected end of said pin when the latter is shifted into throat closing position.

7. In a reel as set forth in claim 5, a cup-shaped cylindrical, forwardly projecting housing associated with said spool for reciprocal movement therewith, said housing being completely open at its forward end to permit free and unfettered line payoff from said spool and spacedly, protectively, surrounding within its confines said reel, flyer and said manipulative means at all times during the operation of said reel.

8. A reel according to claim 1 wherein said manipulative means is disposed forwardly of said flyer, is openly exposed and readily accessible for facile manipulation by a digit of the angler's casting hand.

9. In a reel of the class described, a spool bearing member, a line-carrying spool reciprocally slidable longitudinally therealong, a shaft extending forwardly through said bearing, driving means therefor, means connecting said driving means with said spool for imparting said reciprocatory movement thereto, a flyer fixed to said shaft forwardly of and in adjacent relation to said spool, a pickup element associated with said flyer and movable thereon from one position where it engages said line for winding it upon said spool into a retracted position where said line is left free for payoff from said spool, manipulative means for actuating said pickup member disposed forwardly of said flyer and operable under the control of the reciprocating movement of said spool to move said pickup member to said line-engaging position and easily and readily shiftable by a simple digit manipulation to move said pickup member to its ineffective position.

10. In a reel of the class described a support, a line-receiving spool mounted for reciprocation to and fro thereon, a line wound upon said spool, a flyer rotatably supported forwardly of and in juxtaposition to said spool, means for simultaneously and synchronously driving said flyer in rotation and imparting reciprocatory movement to said spool, a pickup member associated with said flyer and movable from an ineffective position where it lies without the path of travel of said line during payoff from said spool into an effective position where it engages said line for winding the latter upon said spool during retrieve operations, a manipulative control means for said pickup member disposed in readily accessible relation forwardly of said flyer, said control means being operable by a reciprocatory stroke of said spool to move said pickup member into said effective position and operable digitally to move said pickup member into its ineffective position.

11. In a reel of the class described comprising a reciprocally mounted line-winding spool, a line thereon, a rotatable flyer disposed forwardly of said spool in juxtaposition thereto, means for driving said flyer in rotation and synchronously imparting reciprocatory movement to said spool toward and from said flyer, a pickup member mounted on said flyer for movement to one position wherein it projects into the path of said line for engagement therewith to wind said line upon said spool and to another position wherein it is retracted from the path of said line to permit free payoff of the latter from said spool, digitally operable manipulative means associated with said pickup member actuable to move said pickup member from said line engaging position to said retracted position, said manipulative means being mounted in readily accessible relation on an exposed face of said flyer lying distal from said spool, and a finger member associated with said manipulative means engageable by a portion of said spool during the forward stroke of its reciprocatory movement for actuting said manipulative means to move said pickup member into said line-engaging position.

References Cited in the file of this patent

UNITED STATES PATENTS

| 1,176,936 | Waldon | Mar. 28, 1916 |
| 1,875,564 | Croft | Sept. 6, 1932 |
| 2,182,409 | Richards | Dec. 5, 1939 |
| 2,191,004 | Whitcomb | Feb. 20, 1940 |
| 2,336,737 | Kreis | Dec. 14, 1943 |
| 2,452,709 | Aiman | Nov. 2, 1948 |
| 2,546,465 | Martini | Mar. 27, 1951 |
| 2,578,978 | Mandolf et al. | Dec. 18, 1951 |
| 2,600,558 | Mauborgne | June 17, 1952 |
| 2,632,608 | Vincent | Mar. 23, 1953 |

FOREIGN PATENTS

| 938,912 | France | Apr. 12, 1948 |